United States Patent
Godin et al.

(10) Patent No.: US 11,503,437 B2
(45) Date of Patent: Nov. 15, 2022

(54) METHODS AND APPARATUSES FOR MULTICAST-BROADCAST SERVICE (MBS) ACTIVATION AND DEACTIVATION

(71) Applicant: NOKIA TECHNOLOGIES OY, Espoo (FI)

(72) Inventors: Philippe Godin, Versailles (FR); Horst Thomas Belling, Erding (DE); David Navrátil, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/144,446

(22) Filed: Jan. 8, 2021

(65) Prior Publication Data

US 2022/0225057 A1 Jul. 14, 2022

(51) Int. Cl.
*H04W 4/06* (2009.01)
*H04W 76/11* (2018.01)
(Continued)

(52) U.S. Cl.
CPC ............. *H04W 4/06* (2013.01); *H04W 8/08* (2013.01); *H04W 48/16* (2013.01); *H04W 76/11* (2018.02); *H04W 76/27* (2018.02)

(58) Field of Classification Search
CPC ....... H04W 4/06; H04W 76/10; H04W 76/11; H04W 76/27; H04W 8/08; H04W 48/16; H04W 4/08; H04W 36/00; H04W 36/0007; H04W 36/0011; H04W 48/10; H04W 72/005; H04W 76/40; H04W 88/00; H04W 88/02; H04W 88/08; H04W 88/06; H04W 88/12; H04W 88/14; H04W 88/18; H04W 76/00; H04W 64/00; H04W 36/0022;
(Continued)

(56) References Cited

U.S. PATENT DOCUMENTS

2007/0197235 A1* 8/2007 Zhang ............................ 455/466
2009/0270026 A1* 10/2009 Shin et al. .................... 455/3.01
(Continued)

OTHER PUBLICATIONS

Nokia, Nokia Shanghai-Bell, "Conclusion on MBS Session deactivation and activation", S2-2009472, SA WG2 Meeting #142E, Nov. 16-20, 2020.
(Continued)

*Primary Examiner* — Meless N Zewdu
(74) *Attorney, Agent, or Firm* — Squire Patton Boggs (US) LLP

(57) ABSTRACT

Systems, methods, apparatuses, and computer program products for multicast-broadcast service (MBS) deactivation and/or activation are provided. One method may include receiving, at a multicast-broadcast session management entity, a multicast-broadcast service (MBS) session setup message, from at least one management entity, comprising at least one of an identifier of at least one network node requesting setup of the multicast-broadcast service (MBS) session and an identifier of the at least one management entity. The method may also include storing, at the multicast-broadcast management entity, at least one of the identifier of the at least one network node, the identifier of the at least one management entity, or an identifier of a region of the at least one management entity.

11 Claims, 8 Drawing Sheets

(51) Int. Cl.
*H04W 48/16* (2009.01)
*H04W 8/08* (2009.01)
*H04W 76/27* (2018.01)

(58) Field of Classification Search
CPC ......... H04W 36/0027; H04W 36/0033; H04W 80/10; H04W 4/21
See application file for complete search history.

(56) References Cited

U.S. PATENT DOCUMENTS

| | | | |
|---|---|---|---|
| 2018/0167910 A1* | 6/2018 | Zeng | |
| 2019/0223250 A1* | 7/2019 | Dao et al. | H04W 76/20 |
| 2021/0022063 A1* | 1/2021 | Yang et al. | H04W 4/02 |
| 2021/0168569 A1* | 6/2021 | Ayaz et al. | H04W 4/06 |
| 2021/0368427 A1* | 11/2021 | Rommer et al. | H04W 48/16 |
| 2022/0015063 A1* | 1/2022 | Byun et al. | H04W 72/005 |
| 2022/0053455 A1* | 2/2022 | Baek et al. | H04W 72/005 |

OTHER PUBLICATIONS

International Search Report and Written Opinion issued in corresponding PCT International Patent Application No. PCT/EP2021/086097 dated May 2, 2022.
Ericsson, "Solution 2 EN Clarifications", 3GPP Draft; S2-2007934, 3rd Generation Partnership Project (3GPP), SA WG2 Meeting #S2-141E, XP051948186, Oct. 25, 2020.
Oppo, "KI#1, Sol#13: Update to address the ENs and further clarify", 3GPP Draft; S2-2004979, 3rd Generation Partnership Project (3GPP), SA WG2 Meeting #140E, XP051919877, Aug. 13, 2020.

* cited by examiner

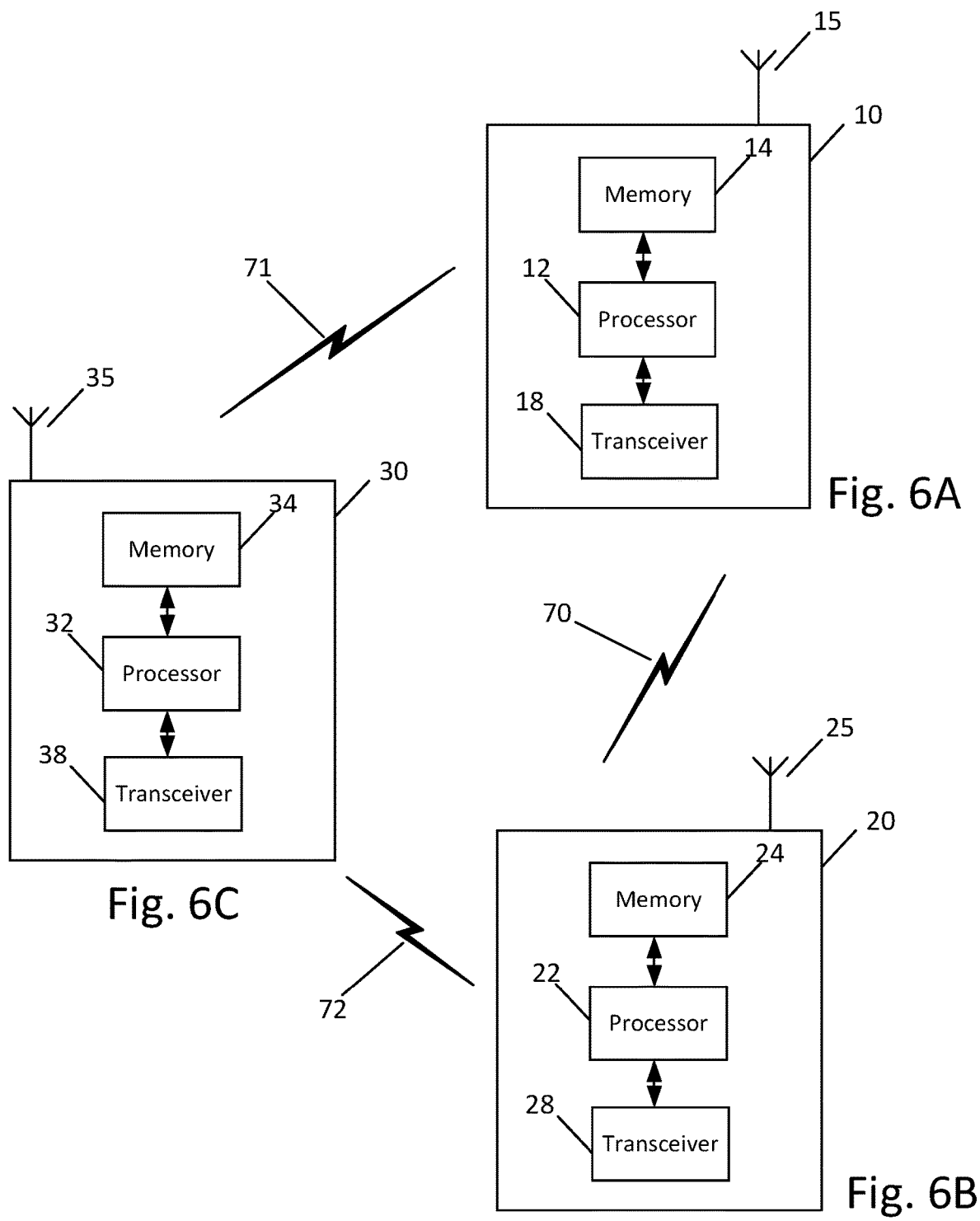

METHODS AND APPARATUSES FOR MULTICAST-BROADCAST SERVICE (MBS) ACTIVATION AND DEACTIVATION

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for multicast-broadcast service (MBS) activation and/or deactivation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment is directed to a method, which may include transmitting, by network node, a multicast-broadcast service (MBS) session setup message comprising at least one of an identifier of the network node and an identifier of a management entity through which the multicast-broadcast service (MBS) session setup message is transmitted. The method may also include receiving a message to deactivate the multicast-broadcast service (MBS) session and, in response to receiving the message to deactivate multicast-broadcast service (MBS) session, moving a context of the multicast-broadcast service (MBS) session to a deactivated state.

Another embodiment is directed to an apparatus that may include at least one processor and at least one memory comprising computer program code. The at least one memory and computer program code configured, with the at least one processor, to cause the apparatus at least to transmit a multicast-broadcast service (MBS) session setup message comprising at least one of an identifier of the apparatus and an identifier of a management entity through which the multicast-broadcast service (MBS) session setup message is transmitted, receive a message to deactivate the multicast-broadcast service (MBS) session and, in response to receiving the message to deactivate multicast-broadcast service (MBS) session, move a context of the multicast-broadcast service (MBS) session to a deactivated state.

Another embodiment is directed to an apparatus that may include means transmitting a multicast-broadcast service (MBS) session setup message comprising at least one of an identifier of the network node and an identifier of a management entity through which the multicast-broadcast service (MBS) session setup message is transmitted. The apparatus may also include means for receiving a message to deactivate the multicast-broadcast service (MBS) session and, in response to receiving the message to deactivate multicast-broadcast service (MBS) session, means for moving a context of the multicast-broadcast service (MBS) session to a deactivated state.

Another embodiment is directed to a method, which may include receiving, from a multicast-broadcast session management entity, a message to deactivate the multicast-broadcast service (MBS) session comprising at least an identifier of one or more network nodes involved in the multicast-broadcast service (MBS) session, and transmitting a deactivate message to deactivate the multicast-broadcast service (MBS) session towards the one or more network nodes indicated in the received deactivate message.

Another embodiment is directed to an apparatus that may include at least one processor and at least one memory comprising computer program code. The at least one memory and computer program code configured, with the at least one processor, to cause the apparatus at least to receive, from a multicast-broadcast session management entity, a message to deactivate the multicast-broadcast service (MBS) session comprising at least an identifier of one or more network nodes involved in the multicast-broadcast service (MBS) session, and to transmit a deactivate message to deactivate the multicast-broadcast service (MBS) session towards the one or more network nodes indicated in the received deactivate message.

Another embodiment is directed to an apparatus that may include means for receiving, from a multicast-broadcast session management entity, a message to deactivate the multicast-broadcast service (MBS) session comprising at least an identifier of one or more network nodes involved in the multicast-broadcast service (MBS) session, and means for transmitting a deactivate message to deactivate the multicast-broadcast service (MBS) session towards the one or more network nodes indicated in the received deactivate message.

Another embodiment is directed to a method, which may include receiving, at a multicast-broadcast session management entity, a multicast-broadcast service (MBS) session setup message from at least one management entity, the multicast-broadcast service (MBS) session setup message comprising at least one of an identifier of at least one network node requesting setup of the multicast-broadcast service (MBS) session and an identifier of the at least one management entity, and storing, at the multicast-broadcast session management entity, at least one of the identifier of the at least one network node, the identifier of the at least one management entity, or an identifier of a region of the at least one management entity.

Another embodiment is directed to an apparatus that includes at least one processor and at least one memory comprising computer program code. The at least one memory and computer program code configured, with the at least one processor, to cause the apparatus at least to receive a multicast-broadcast service (MBS) session setup message from at least one management entity, the multicast-broadcast service (MBS) session setup message comprising at least one of an identifier of at least one network node requesting setup of the multicast-broadcast service (MBS) session and an identifier of the at least one management entity, and to store at least one of the identifier of the at least one network node, the identifier of the at least one management entity, or an identifier of a region of the at least one management entity.

Another embodiment is directed to an apparatus that may include means for receiving a multicast-broadcast service (MBS) session setup message from at least one management entity, the multicast-broadcast service (MBS) session setup message comprising at least one of an identifier of at least one network node requesting setup of the multicast-broadcast service (MBS) session and an identifier of the at least one management entity. The apparatus may also include means for storing at least one of the identifier of the at least one network node, the identifier of the at least one management entity, or an identifier of a region of the at least one management entity.

BRIEF DESCRIPTION OF THE DRAWINGS

For proper understanding of example embodiments, reference should be made to the accompanying drawings, wherein:

FIG. 6A illustrates an example block diagram of an apparatus, according to an embodiment;

FIG. 6B illustrates an example block diagram of an apparatus, according to an embodiment; and FIG. 6C illustrates an example block diagram of an apparatus, according to an embodiment.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for multicast-broadcast service (MBS) activation and/or deactivation, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Figure 1:
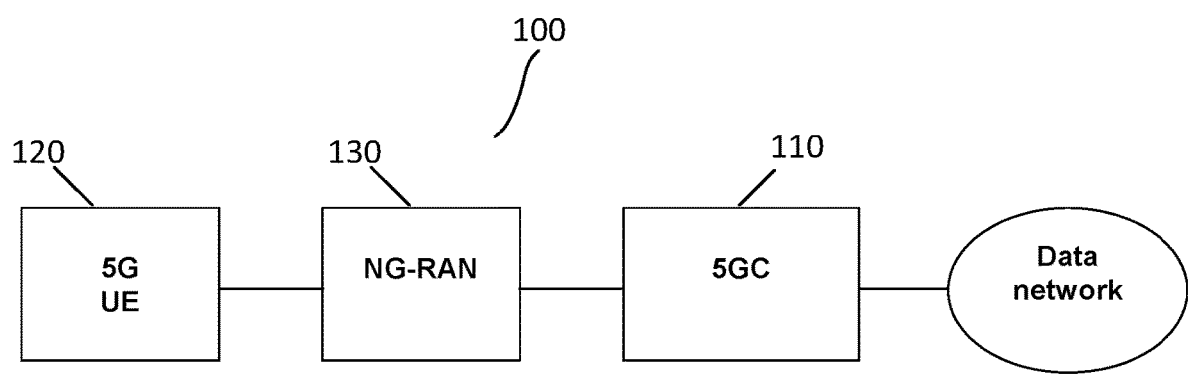
FIG. 1 illustrates an example block diagram of an MBS architecture, according to one example.

FIG. 1 illustrates an example block diagram of an MBS architecture 100. 5G MBS service information may be delivered from the application/service layer to 5G core network (5GC) 110. UE(s) 120 may request to join an MBS session, MBS flow transport may be established, and MBS data may be delivered to the UE(s) 120. An MBS session can be deactivated and/or activated. For example, the MBS session can be deactivated/activated either from application function (AF) trigger (e.g., via network exposure function (NEF)) or from multicast user plane function (MB-UPF) trigger upon detection of multicast data suspension or resumption of activity. During the periods where the MBS session is deactivated, it has been agreed that the next generation radio access network (NG-RAN) node 130 could move some UE(s) to radio resource control (RRC) idle mode.

Thus, the MBS session may be stopped upon AF requests, and UE(s) that have joined that multicast session can become IDLE. In addition, the MBS session may be deactivated when the MB-UPF detects no multicast data for a configurable period, and similarly UE(s) that have joined that multicast session can become IDLE.

Thus, an approach is needed for how to handle MBS contexts in NG-RAN nodes when the MBS session is deactivated, and how to handle them when the MBS session is activated again. For example, a solution may be needed in the different cases where NG-RAN node could decide to keep UEs connected, or move the UEs to RRC inactive state or move them to RRC idle state. Also, it may be desirable to avoid a surge of signalling in the network to manage these contexts both at deactivation time and at activation time.

Currently, when deactivation is triggered, it is foreseen that the MBS contexts are kept in 5GC and removed from NG-RAN nodes. In particular, when the MBS Session is deactivated by 5GC, the MBS Session context is kept in 5GC, but the AN resource with context and N3 tunnel for 5GC Shared MBS delivery method are released.

When the MBS Session needs to be activated, the MB-UPF may send a message to the multicast-broadcast session management function (MB-SMF). When the MB-SMF starts the MBS session activation for establishing the transmission resources, the MB-SMF may notify the session activation to NG-RANs via session management functions (SMFs) and/or access and mobility management functions (AMFs) serving UEs within the multicast session.

The MBS Session may be activated/started upon AF requests. When the MBS Session needs to be activated/started, the NEF or MBSF may send a message to the MB-SMF for establishing the transmission resources. The MB-SMF may obtain the related multicast QoS flow information from a policy control function (PCF). When the MB-SMF restarts the MBS session, the MB-SMF may notify the session activation to NG-RANs via SMFs/AMFs serving UEs within the multicast session.

However, currently, an exact notification mechanism has not been specified. Also, the release of all MBS context information can be signalling intensive. It is also currently unclear how MBS context for RRC connected UEs or RRC inactive UEs would be re-created if removed at deactivation time. It is further unclear how the notification can work for the UEs which would have been moved to RRC idle and how the MBS context in RAN can be re-established if they are all removed.

As will be discussed in detail below, certain example embodiments may provide solutions for at least the issues discussed above, as well as other problems that may benefit from the approaches described herein.

Some example embodiments provide mechanisms for signalling deactivation when an MB-SMF receives a trigger to deactivate from a MB-UPF and/or originating from AF. As will be discussed in more detail below, according to certain example embodiments, a process for deactivation or activation may rely on some storage of information in the MB-SMF, for example.

Figure 2:
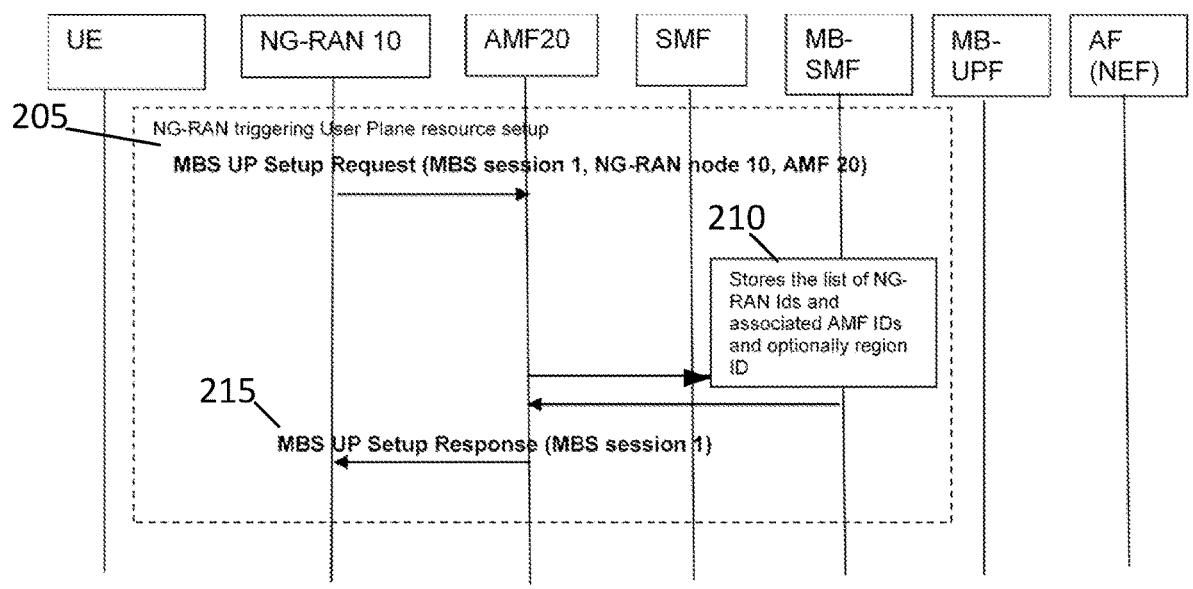
FIG. 2 illustrates an example signaling diagram depicting the storage of information at the MB-SMF, according to an embodiment.

FIG. 2 illustrates an example signaling diagram depicting the storage of information at the MB-SMF, according to an embodiment. As illustrated in the example of FIG. 2, at 205, when an NG-RAN node sets up user plane (UP) resources with a MB-UPF via a MB-SMF, the NG-RAN node may include the NG-RAN node ID and possibly also AMF ID (e.g., AMF ID of the AMF through which the setup message is sent to MB-SMF) in a NGAP message. Upon receiving the MBS UP setup message, at 210, the MB-SMF may store the NG-RAN node ID and/or the associated AMF ID and/or the region ID of the AMF through which the message is being delivered. For example, in certain embodiments, the MB-SMF may build and store a list of NG-RAN node IDs per AMF or a list of NG-RAN nodes IDs per region. In an embodiment, at 215, the NG-RAN node may receive a MBS UP setup response from the AMF.

Figure 3:
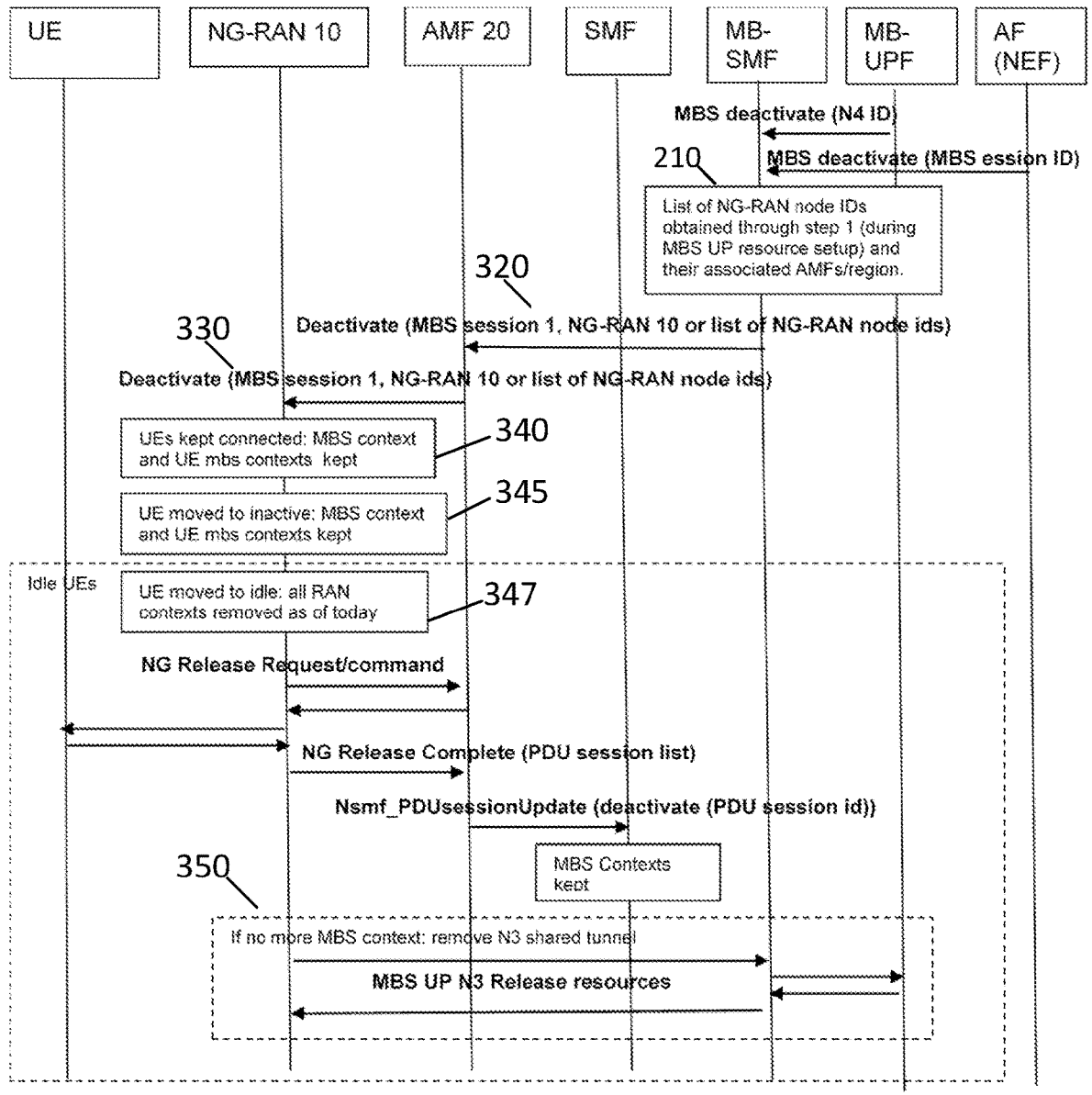
FIG. 3 illustrates an example signaling diagram depicting deactivation of a MBS session, according to an embodiment.

FIG. 3 illustrates an example signaling diagram depicting deactivation of a MBS session, according to an embodiment. In one embodiment, at any point in time, when a MB-SMF wants to trigger the deactivation of an MBS session, it may retrieve the list of all NG-RAN nodes involved in that MBS session from storage at 210. Then, at 320, the MB-SMF may send a deactivate message to one or more AMFs.

For example, in one embodiment, the MB-SMF may send a deactivate message to the involved NG-RAN node(s) via the associated AMF stored at 210. In this embodiment, the deactivate message may at least include the ID(s) of the NG-RAN node(s) involved in the MBS session, in order for the AMF to route the deactivate message to the correct NG-RAN node(s).

According to a further embodiment, the MB-SMF may send a deactivate message to the associated AMF(s) stored at 210. In this embodiment, the deactivate message may include the list of the NG-RAN node IDs involved in the MBS session associated with this AMF at 210. The AMF may duplicate the message towards the involved NG-RAN node(s), as identified in the received deactivate message, or may build and send one individual message for each NG-RAN node containing the targeted NG-RAN node ID. In other embodiments, the MB-SMF may send the activate message to any AMF of the stored region to which the list of targeted NG-RAN node ID(s) belong.

In yet a further embodiment, the MB-SMF may send a deactivate message to one AMF per region as stored at 210. In this embodiment, the deactivate message may include the list of the NG-RAN node IDs involved in the MBS session for this region. The AMF (e.g., one AMF of the region) may duplicate the message towards the involved NG-RAN node (s) or may build an individual message for each NG-RAN node containing the targeted NG-RAN node ID.

According to certain embodiments, upon receiving the deactivate message at 330, a NG-RAN node may move the MBS context to a "deactivated state". As long as the MBS context state remains "deactivated", the NG-RAN node may keep the UE MBS context information in UE context of UEs which stay RRC connected as shown at 340, the NG-RAN node may keep the UE MBS context information in UE context of UEs which stay RRC inactive as shown at 345, the NG-RAN node may remove the UE context including the UE MBS context information of UEs which it decides to move to RRC idle as shown at 347. Besides, the NG-RAN node may keep the N3 shared tunnel as long as there is at least one UE in RRC connected or RRC inactive state in the NG-RAN node. The NG-RAN node may also keep the MBS context for the MBS session as long as there is at least one UE in RRC connected or RRC inactive state in the NG-RAN node. Otherwise, in an embodiment, the NG-RAN node may remove the N3 shared tunnel, at 350, when there is no more MBS context.

Figure 4:
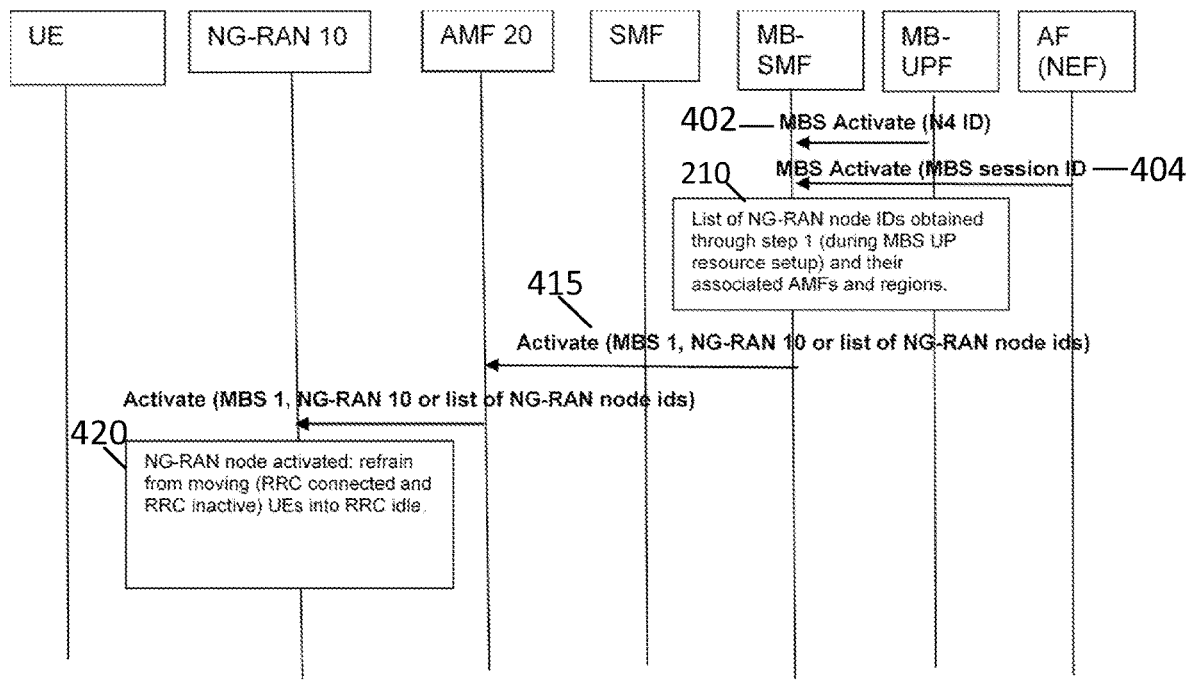
FIG. 4 illustrates an example signaling diagram depicting the activation of a MBS session, according to an embodiment.

FIG. 4 illustrates an example signaling diagram depicting the activation of a MBS session, according to an embodiment. For instance, the example of FIG. 4 illustrates a process for signalling activation when an MB-SMF receives a trigger to activate from a MB-UPF (resumption of multicast traffic) at 402 and/or originating from an AF at 404. As illustrated in the example of FIG. 4, at any point in time, when a MB-SMF wants to trigger the activation of an MBS session, the MB-SMF may retrieve the list of the NG-RAN node(s) involved in that MBS session from storage at 210. Then, at 415, the MB-SMF may send an activate message.

For example, in one embodiment, the MB-SMF may send an activate message to each involved NG-RAN node via the associated AMF stored at 210. In this embodiment, the activate message may include ID(s) of the NG-RAN node involved in the MBS session, in order for the AMF to route the activate message to the correct NG-RAN node.

In another embodiment, the MB-SMF may send an activate message to the associated AMF(s) stored at 210. According to this embodiment, the activate message may include the list of NG-RAN node IDs involved in the MBS session associated with this AMF at 210. The AMF may duplicate the activate message towards each involved NG-RAN node and/or build and send one individual activate message for each NG-RAN node containing the targeted NG-RAN node ID.

According to a further embodiment, the MB-SMF may send an activate message to one AMF per region as stored at 210. In this embodiment, the activate message may include the list of the NG-RAN node ID(s) involved in the MBS session for this region. The AMF may duplicate the activate message towards each involved NG-RAN node and/or build one individual activate message for each NG- RAN node containing the targeted NG-RAN node ID. In other embodiments, the MB-SMF may send the activate message to any AMF of the stored region to which the list of targeted NG-RAN node ID(s) belong.

In certain embodiments, upon receiving the activate message for an MBS session, at 420, a NG-RAN node may refrain from moving a RRC connected UE or RRC inactive UE involved in that MBS session into RRC idle state.

Figure 5A:
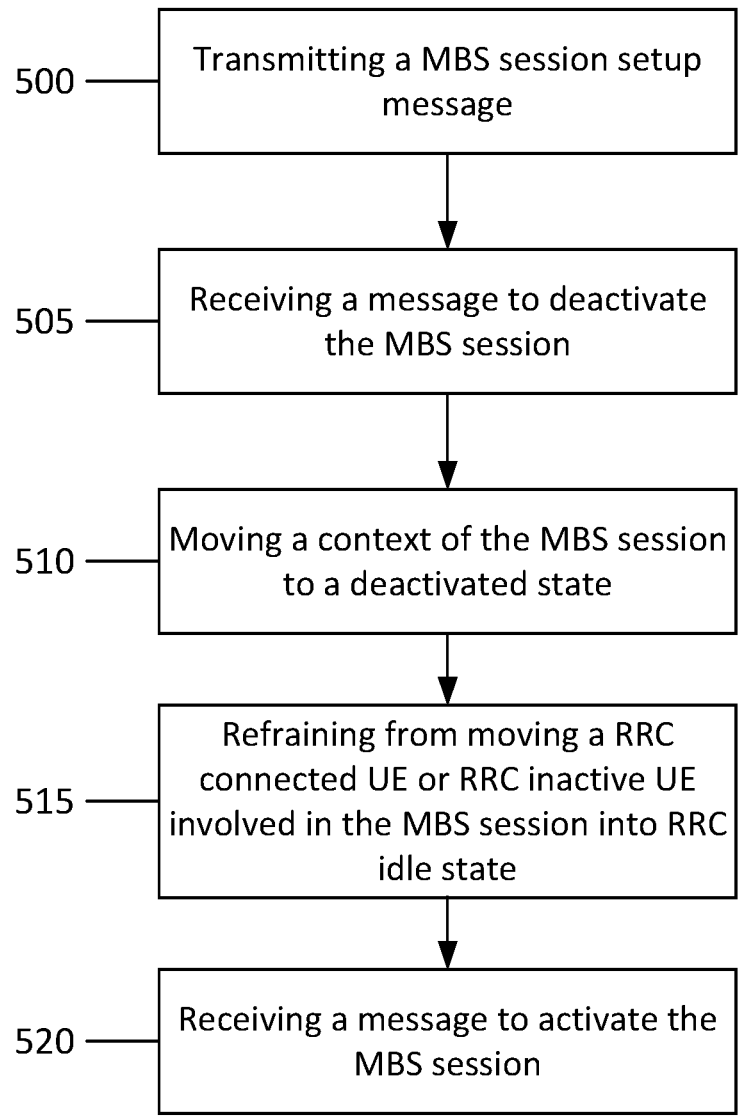
FIG. 5A illustrates an example flow chart of a method, according to an embodiment.

FIG. 5A illustrates an example flow chart of a method of deactivating and/or activating an MBS session, according an embodiment. In certain example embodiments, the flow diagram of FIG. 5A may be performed by a network entity or network node in a communications system, such as LTE or 5G NR. In some example embodiments, the network entity performing the method of FIG. 5A may include or be included in a base station, access node, node B, eNB, gNB, NG-RAN node, or the like. In one example embodiment, the method of FIG. 5A may be performed by a NG-RAN node, such as the NG-RAN node depicted in the example diagrams of FIGS. 1-4.

As illustrated in the example of FIG. 5A, the method may include, at 500, transmitting a MBS session setup message including at least one of an identifier of the network node (e.g., NG-RAN node) transmitting the MBS session setup message and an identifier of a management entity (e.g., an AMF) through which the MBS session setup message is transmitted. In an embodiment, the method may also include, at 505, receiving a message to deactivate the MBS session, e.g., from a MB-SMF via a management entity (e.g., an AMF). According to certain embodiments, in response to receiving the message to deactivate the MBS session, the method may include, at 510, moving a context of the MBS session to a deactivated state.

In some embodiments, while the MBS context is in the deactivated state, the method may include: keeping the UE MBS context information in a user equipment (UE) context of one or more user equipment (UEs) that remain in radio resource control (RRC) connected state, keeping the UE MBS context information in the user equipment (UE) context of one or more user equipment (UEs) that remain in radio resource control (RRC) inactive state, removing the user equipment (UE) context including the UE MBS context of one or more user equipment (UEs) that the network node decides to move to radio resource control (RRC) idle state. Besides, in an embodiment, the method may include keeping a N3 shared tunnel while there is at least one user equipment (UE) in radio resource control (RRC) connected or RRC inactive state in the network node. In addition, in some embodiments, the method may include keeping the MBS context in the NG-RAN node while there is at least one user equipment (UE) in radio resource control (RRC) connected or RRC inactive state in the network node.

According to certain embodiments, the method of FIG. 5A may optionally include, at 515, while MBS context is deactivated, refraining from moving a radio resource control (RRC) connected user equipment (UE) or radio resource control (RRC) inactive user equipment (UE) involved in the MBS session into radio resource control (RRC) idle state. In one embodiment, the method may include, at 520, while MBS context is deactivated, receiving a message to activate the MBS session.

Figure 5B:
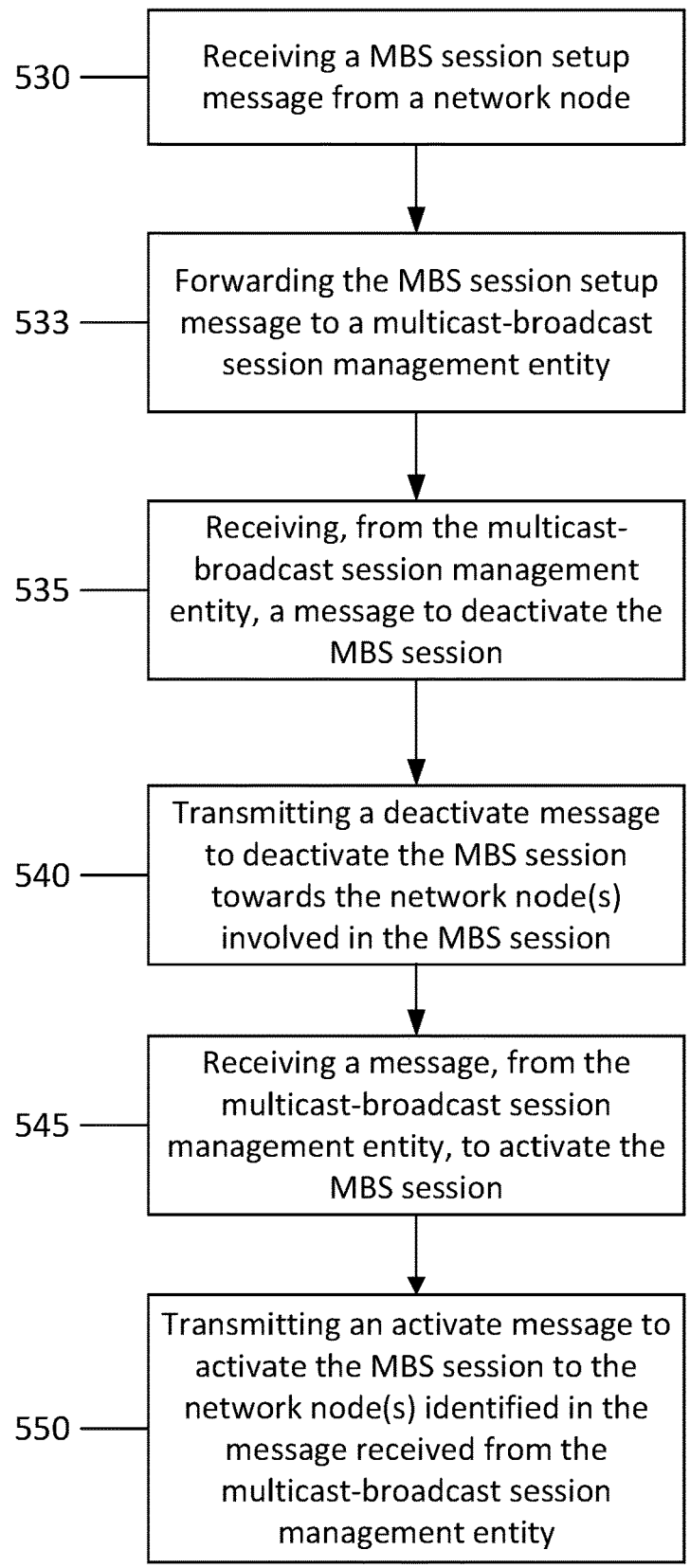
FIG. 5B illustrates an example flow chart of a method, according to an embodiment.

FIG. 5B illustrates an example flow chart of a method of deactivating and/or activating an MBS session, according an embodiment. In certain example embodiments, the flow diagram of FIG. 5B may be performed by a network entity or network node in a communications system, such as LTE or 5GS. In some example embodiments, the network entity performing the method of FIG. 5B may include or be included in a management entity or function, such as an AMF, SMF and/or AF, for example. In one example embodiment, the method of FIG. 5B may be performed by an AMF, such as the AMF depicted in the example diagrams of FIGS. 2-4.

As illustrated in the example of FIG. 5B, the method may include, at 530, receiving a MBS session setup message from a network node (e.g., NG-RAN node). The MBS session setup message may include at least one of an identifier of the network node and/or optionally an identifier of the management entity (e.g., AMF). In an embodiment, the method may include, at 533, forwarding the MBS session setup message to a multicast-broadcast session management entity, such as a MB-SMF. According to certain embodiments, the method may also include, at 535, receiving, from the multicast-broadcast session management entity (e.g., MB-SMF), a message to deactivate the MBS session. The message to deactivate the MBS session may include at least an identifier of one or more network nodes involved in the MBS session. In some embodiments, the method may include, at 540, transmitting a deactivate message to deactivate the MBS session towards the one or more network nodes involved in the MBS session.

According to certain embodiments, the transmitting 540 of the deactivate message may include: duplicating the deactivate message towards the one or more network nodes involved in the MBS session, or building and transmitting an individual message for each of the one or more network nodes involved in the MBS session based on the identifier of the network nodes received from the multicast-broadcast session management entity in the message to deactivate the MBS session.

In some embodiments, the method may optionally include, at 545, receiving a message, from the multicast-broadcast session management entity, to activate the MBS session. The message to activate the MBS session may include at least an identifier of one or more network nodes involved in the MBS session. The method may then include, at 550, routing or transmitting an activate message to activate the MBS session to the one or more network nodes identified in the message received from the multicast-broadcast session management entity. In one embodiment, the transmitting of the activate message may include: duplicating the activate message towards the one or more network nodes involved in the MBS session, or building and transmitting an individual message for each of the one or more network nodes involved in the MBS session based on the identifier of the network nodes received from the multicast-broadcast session management entity in the message to activate the MBS session.

Figure 5C:
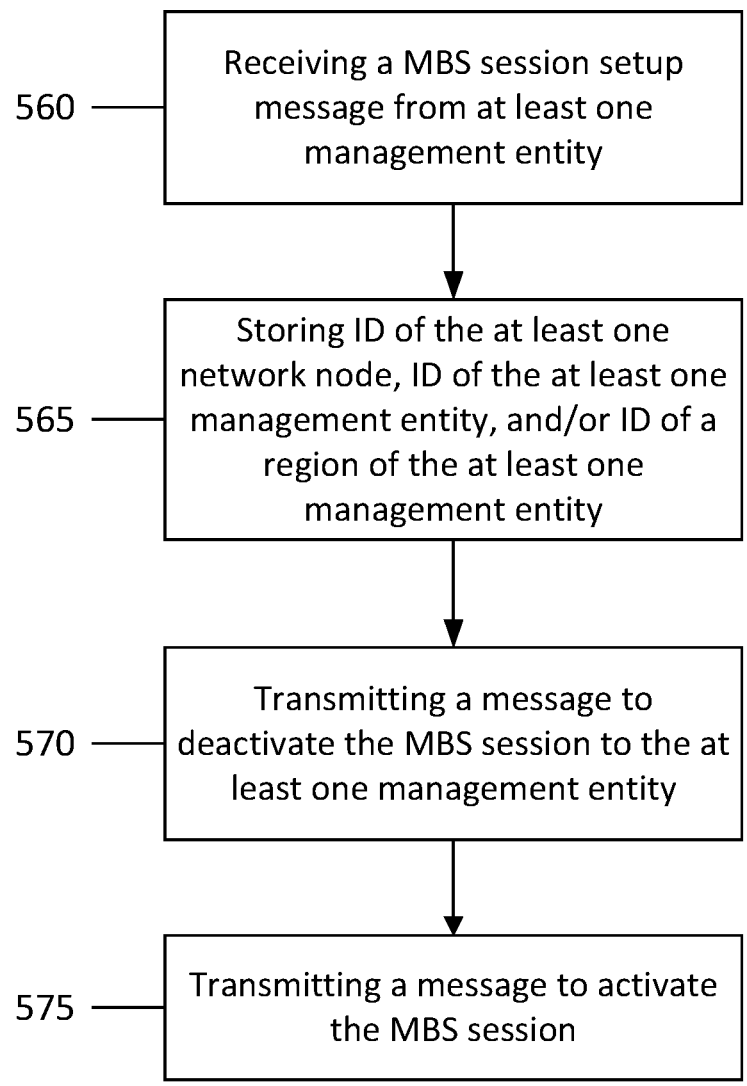
FIG. 5C illustrates an example flow chart of a method, according to an embodiment.

FIG. 5C illustrates an example flow chart of a method of deactivating and/or activating an MBS session, according an embodiment. In certain example embodiments, the flow diagram of FIG. 5C may be performed by a network entity or network node in a communications system, such as LTE or 5GS. In some example embodiments, the network entity performing the method of FIG. 5C may include or be included in a multicast-broadcast session management entity or function, such as MB-SMF, for example. In one example embodiment, the method of FIG. 5C may be performed by a MB-SMF, such as the MB-SMF depicted in the example diagrams of FIGS. 2-4.

As illustrated in the example of FIG. 5C, the method may include, at 560, receiving a MBS session setup message from at least one management entity (e.g., an AMF). The MBS session setup message may include at least one of an identifier of at least one network node (e.g., NG-RAN node) requesting setup of the MBS session and an identifier of the at least one management entity (e.g., the AMF). In an embodiment, the method may include, at 565, storing one or more of the identifier of the at least one network node (e.g., NG-RAN nodes), the identifier of the at least one management entity (e.g., AMFs), and/or an identifier of a region of the at least one management entity (e.g., regions of the AMFs). In some embodiments, the storing 565 may include building and storing at least one of a list of the identifier of the at least one network node per management entity (e.g., IDs of NG-RAN nodes per AMF) or a list of the identifier of the at least one network node per region (e.g., IDs of RAN nodes per AMF region).

According to certain embodiments, when the multicast-broadcast management entity decides to trigger deactivation of the MBS session, the method may include, at 570, transmitting a message to deactivate the MBS session to the at least one management entity. In this embodiment, the message may include at least an identifier of at least one network node involved in the MBS session. In an embodiment, the transmitting 570 of the message to deactivate the multicast-broadcast service (MBS) session may include transmitting a deactivate message, to the at least one management entity, including a list of identifiers of at least one network node involved in the MBS session associated with the at least one management entity. Additionally or alternatively, the transmitting 570 of the message to deactivate the multicast-broadcast service (MBS) session may include transmitting a deactivate message, to one management entity per stored region, including a list of identifiers of at least one network node involved in the MBS session for the region.

In some embodiments, when the multicast-broadcast management entity decides to trigger activation of the multicast-broadcast service (MBS) session, the method may include retrieving an identifier of at least one network node involved in the MBS session and, at 575, transmitting a message to activate the MBS session, which may include at least an identifier of at least one network node involved in the MBS session. According to certain embodiments, the transmitting 575 of the message to activate the MBS session may include transmitting an activate message, to the at least one management entity (e.g., AMF), including a list of identifiers of at least one network node involved in the MBS session associated with the at least one management entity. Additionally or alternatively, the transmitting 575 of the message to activate the MBS session may include transmitting an activate message, to one management entity (e.g., AMF) per stored region, including a list of identifiers of at least one network node involved in the MBS session for the region.

FIG. 6A illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), transmission receive point (TRP), high altitude platform station (HAPS), integrated access and backhaul (IAB) node, and/or WLAN access point, associated with a radio access network, such as a LTE network, 5G or NR. In one example embodiment, apparatus 10 may represent a NG-RAN, such as that illustrated in FIGS. 1-4.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6A.

As illustrated in the example of FIG. 6A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 6A, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and/or receive information. The transceiver 18 may include, for example, a plurality of radio interfaces that may be coupled to the antenna(s) 15, or may include any other appropriate transceiving means. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (e.g., digital-to-analog converters and the like), mappers, a Fast Fourier Transform (FFT) module, and/or the like, e.g., to generate symbols or signals for transmission via one or more downlinks and to receive symbols (e.g., via an uplink).

As such, transceiver 18 may be configured to modulate information on to a carrier waveform for transmission by the antenna(s) 15 and to demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input device and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, TRP, HAPS, IAB node, WLAN access point, or the like. In one example embodiment, apparatus 10 may be a network node in NG-RAN. For example, in some embodiments, apparatus 10 may be configured to perform one or more of the processes depicted in any of the flow charts or signaling diagrams described herein, such as that illustrated in FIG. 5A. In some embodiments, as discussed herein, apparatus 10 may be configured to perform a procedure relating to deactivating and/or activating a MBS session, for example.

FIG. 6B illustrates an example of an apparatus 20 according to another embodiment. In an embodiment, apparatus 20 may be a node or element in a communications network or associated with such a network, such as a satellite, base station, a Node B, an evolved Node B (eNB), 5G Node B or access point, next generation Node B (NG-NB or gNB), and/or WLAN access point, associated with a radio access network, such as a LTE network, 5G or NR. According to one embodiment, apparatus 20 may be or may be included in a management entity or function, such as an AMF, SMF and/or AF, such as those depicted in the example diagrams of FIGS. 2-4.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 6B.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6B.

As illustrated in the example of FIG. 6B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some embodiments, apparatus 20 may be a management entity or function, such as an AMF, SMF and/or AF, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein. In an embodiment, apparatus 20 may be controlled by memory 24 and processor 22 to perform the method illustrated in the example of FIG. 5B. Thus, according to an embodiment, apparatus 20 may be configured to perform a procedure relating to MBS session activation and/or deactivation, for instance.

FIG. 6C illustrates an example of an apparatus 30 according to another example embodiment. In an example embodiment, apparatus 30 may be a node or element in a communications network or associated with such a network, such as a satellite, base station, a Node B, an evolved Node B (eNB), 5G Node B or access point, next generation Node B (NG-NB or gNB), and/or WLAN access point, associated with a radio access network, such as a LTE network, 5G or NR. According to one embodiment, apparatus 30 may be or may be included in a multicast-broadcast management entity or function, such as MB-SMF, for example.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 6C.

As illustrated in the example of FIG. 6C, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 6C, multiple processors may be utilized according to other example embodiments.

For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a multicast-broadcast management entity or function, such as MB-SMF, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein. In one embodiment, apparatus 30 may be controlled by memory 34 and processor 32 to perform the method according to the example of FIG. 5C. According to certain example embodiments, apparatus 30 may be configured to perform a procedure relating to MBS session activation and/or deactivation, for instance.

In some embodiments, an apparatus (e.g., apparatus 10 and/or apparatus 20 and/or apparatus 30) may include means for performing a method or any of the variants discussed herein, such as, a method described with reference to one or more of FIGS. 2-5. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and management. For example, as outlined above, in certain embodiments, the deactivation and/or activation utilizes MB-SMF storage of the NG-RAN node IDs. As a result, there is no need for information storage in the AMF, as the AMF is just used as a routing proxy in the delivery of a deactivate message and/or activate message. In addition, according to certain embodiments, the deactivation and/or activation does not involve the SMF (of the UEs) as shown in the examples of FIGS. 2-4. Further, in some embodiments, the MBS contexts, MBS parts in UE contexts and N3 shared tunnel are not all removed but just for those UEs which the NG-RAN node will decide to move to RRC idle. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A method, comprising:

transmitting, by network node, a multicast-broadcast service (MBS) session setup message comprising at least one of an identifier of the network node and an identifier of a management entity through which the multicast-broadcast service (MBS) session setup message is transmitted;

receiving a message to deactivate the multicast-broadcast service (MBS) session; and in response to receiving the message to deactivate multicast-broadcast service (MBS) session, moving a context of the multicast-broadcast service (MBS) session to a deactivated state, wherein, while the context of the multicast-broadcast service (MBS) is in the deactivated state, the method comprises at least one of:

keeping the multicast-broadcast service (MBS) context information in a user equipment (UE) context of one or more user equipment (UEs) that remain in radio resource control (RRC) connected state;

keeping the multicast-broadcast service (MBS) context information in the user equipment (UE) context of one or more user equipment (UEs) that remain in radio resource control (RRC) inactive state;

keeping the MBS session context information in the network node while there is at least one user equipment (UE) in radio resource control (RRC) connected or radio resource control (RRC) inactive state in the network node; or keeping a N3 shared tunnel while there is at least one user equipment (UE) in radio resource control (RRC) connected or radio resource control (RRC) inactive state in the network node.

2. The method of claim 1, further comprising:

receiving a message to activate the multicast-broadcast service (MBS) session; and refraining from moving a radio resource control (RRC) connected user equipment (UE) or radio resource control (RRC) inactive user equipment (UE) involved in the multicast-broadcast service (MBS) session into radio resource control (RRC) idle state.

3. An apparatus, comprising:

at least one processor; and at least one memory comprising computer program code, the at least one memory and computer program code configured, with the at least one processor, to cause the apparatus at least to:

transmit a multicast-broadcast service (MBS) session setup message comprising at least one of an identifier of the apparatus and an identifier of a management entity through which the multicast-broadcast service (MBS) session setup message is transmitted;

receive a message to deactivate the multicast-broadcast service (MBS) session; and in response to receiving the message to deactivate multicast-broadcast service (MBS) session, move a context of the multicast-broadcast service (MBS) session to a deactivated state, wherein, while the multicast-broadcast service (MBS) context is in the deactivated state, the at least one memory and computer program code are configured, with the at least one processor, to cause the apparatus at least to:
keep the multicast-broadcast service (MBS) context information in a user equipment (UE) context of one or more user equipment (UEs) that remain in radio resource control (RRC) connected state;
keep the multicast-broadcast service (MBS) context information in the user equipment (UE) context of one or more user equipment (UEs) that remain in radio resource control (RRC) inactive state;
keep the MBS session context information in the apparatus while there is at least one user equipment (UE) in radio resource control (RRC) connected or radio resource control (RRC) inactive state in the network node; or
keep a N3 shared tunnel while there is at least one user equipment (UE) in radio resource control (RRC) connected or radio resource control (RRC) inactive state in the apparatus.

4. A method, comprising:
receiving, from a multicast-broadcast session management entity, a message to deactivate the multicast-broadcast service (MBS) session comprising at least an identifier of one or more network nodes involved in the multicast-broadcast service (MBS) session; and
transmitting a deactivate message to deactivate the multicast-broadcast service (MBS) session towards the one or more network nodes indicated in the received deactivate message,
wherein, while the context of the multicast-broadcast service (MBS) is in the deactivated state:
the multicast-broadcast service (MBS) context information is kept in a user equipment (UE) context of one or more user equipment (UEs) that remain in radio resource control (RRC) connected state;
the multicast-broadcast service (MBS) context information is kept in the user equipment (UE) context of one or more user equipment (UEs) that remain in radio resource control (RRC) inactive state;
the MBS session context information is kept in the multicast-broadcast session management entity while there is at least one user equipment (UE) in radio resource control (RRC) connected or radio resource control (RRC) inactive state in the multicast-broadcast session management entity; or
a N3 shared tunnel is kept while there is at least one user equipment (UE) in radio resource control (RRC) connected or radio resource control (RRC) inactive state in the multicast-broadcast session management entity.

5. The method of claim 4, further comprising, before receiving the message to deactivate:
receiving, at the management entity, a multicast-broadcast service (MBS) session setup message from a network node, the multicast-broadcast service (MBS) session setup message comprising at least one of an identifier of the network node and an identifier of the management entity;
forwarding, by the management entity, the multicast-broadcast service (MBS) session setup message to the multicast-broadcast session management entity.

6. The method of claim 4, wherein the transmitting of the deactivate message comprises at least one of:

duplicating the deactivate message towards the one or more network nodes indicated in the deactivate message received from the multicast-broadcast session management entity; or
building and transmitting an individual message for each of the one or more network nodes indicated in the deactivate message received from the multicast-broadcast session management entity to deactivate the multicast-broadcast service (MBS) session.

7. The method of claim 6, further comprising:
receiving a message, from the multicast-broadcast session management entity, to activate the multicast-broadcast service (MBS) session comprising at least an identifier of one or more network nodes involved in the multicast-broadcast service (MBS) session; and
transmitting an activate message to activate the multicast-broadcast service (MBS) session to the one or more network nodes identified in the message received from the multicast-broadcast session management entity.

8. The method of claim 7, wherein the transmitting of the activate message comprises:
duplicating the activate message towards the one or more network nodes identified in the activate message received from the multicast-broadcast session management entity; or
building and transmitting an individual message for each of the one or more network nodes identified in the activate message received from the multicast-broadcast session management entity to activate the multicast-broadcast service (MBS) session.

9. An apparatus, comprising:
at least one processor; and
at least one memory comprising computer program code,
the at least one memory and computer program code configured, with the at least one processor, to cause the apparatus at least to:
receive, from a multicast-broadcast session management entity, a message to deactivate the multicast-broadcast service (MBS) session comprising at least an identifier of one or more network nodes involved in the multicast-broadcast service (MBS) session; and
transmit a deactivate message to deactivate the multicast-broadcast service (MBS) session towards the one or more network nodes indicated in the received deactivate message,
wherein, while the context of the multicast-broadcast service (MBS) is in the deactivated state:
the multicast-broadcast service (MBS) context information is kept in a user equipment (UE) context of one or more user equipment (UEs) that remain in radio resource control (RRC) connected state;
the multicast-broadcast service (MBS) context information is kept in the user equipment (UE) context of one or more user equipment (UEs) that remain in radio resource control (RRC) inactive state;
the MBS session context information is kept in the multicast-broadcast session management entity while there is at least one user equipment (UE) in radio resource control (RRC) connected or radio resource control (RRC) inactive state in the multicast-broadcast session management entity; or
a N3 shared tunnel is kept while there is at least one user equipment (UE) in radio resource control (RRC) connected or radio resource control (RRC) inactive state in the multicast-broadcast session management entity.

10. A non-transitory computer readable medium comprising program instructions stored thereon for performing the method according to claim 1.

11. A non-transitory computer readable medium comprising program instructions stored thereon for performing the method according to claim 2.

\* \* \* \* \*